United States Patent [19]

Kozoll et al.

[11] Patent Number: 5,079,700
[45] Date of Patent: Jan. 7, 1992

[54] METHOD FOR COPYING A MARKED PORTION OF A STRUCTURED DOCUMENT

[75] Inventors: Michael J. Kozoll, Gaithersburg; Chan S. Lim, Potomac; Robert Perry, Jr., Silver Spring, all of Md.

[73] Assignee: International Business Machines Corporation, Armonk, N.Y.

[21] Appl. No.: 681,466

[22] Filed: Apr. 4, 1991

Related U.S. Application Data

[63] Continuation of Ser. No. 344,342, Apr. 26, 1989, abandoned.

[51] Int. Cl.⁵ ............................................. G06F 5/00
[52] U.S. Cl. .............................. 395/700; 364/DIG. 2; 364/700
[58] Field of Search .................... 364/419, 200, 900

[56] References Cited

U.S. PATENT DOCUMENTS

| | | | |
|---|---|---|---|
| 4,393,463 | 7/1983 | Aiken, Jr. | 364/900 |
| 4,454,576 | 7/1984 | McInroy et al. | 364/200 |
| 4,481,603 | 11/1984 | McCaskill et al. | 364/900 |
| 4,539,653 | 9/1985 | Bartlett et al. | 364/900 |
| 4,633,430 | 12/1986 | Cooper | 364/900 |
| 4,686,649 | 8/1987 | Rush et al. | |
| 4,713,754 | 12/1987 | Agarwal et al. | 364/200 |
| 4,723,210 | 2/1988 | Barker et al. | 364/200 |
| 4,739,477 | 4/1988 | Barker et al. | 364/300 |
| 4,807,182 | 2/1989 | Queen | 364/900 |
| 4,812,966 | 3/1989 | Takagi et al. | 364/200 |
| 4,815,029 | 8/1989 | Barker et al. | 364/900 |
| 4,939,507 | 7/1990 | Beard et al. | 340/706 |
| 4,974,194 | 11/1990 | Barker et al. | 364/900 |
| 4,996,665 | 2/1991 | Normura | 364/900 |

Primary Examiner—Allen R. MacDonald
Assistant Examiner—C. Shin
Attorney, Agent, or Firm—John E. Hoel

[57] ABSTRACT

A method is disclosed for copying a marked portion of a structured document so as to prevent damaging the structure of the document at the target location where the contents of the mark is to be inserted. The method includes determining whether there are unbalanced begin tags or end tags in the portion to be copied and then inserting additional tags to balance the missing tags at the target location.

2 Claims, 4 Drawing Sheets

METHOD FOR COPYING A MARKED PORTION OF A STRUCTURED DOCUMENT

This application is a continuation of application Ser. No. 344,342, filed Apr. 26, 1989, now abandoned.

BACKGROUND OF THE INVENTION

1. Technical Field

The invention disclosed broadly relates to data processing methods and more particularly relates to an improved method for copying a marked portion of a structured document.

2. Background Art

Current editors provide a block copy function which allows a user to copy a marked portion of a document. These copy functions copy only what is marked. If a matched pair of formatting controls or tags are required to provide particular formatting (e.g.—boldface type) and only one control or tag is included in the mark, the block copy will copy an unmatched control. Although this type of copy is flexible and never fails, it normally causes the target document to become invalid (i.e.—incorrectly formatted or mis-structured).

In an editor which supports structured documents, this same type of unstructured copy could result in a document whose structure is invalid (i.e. no longer adheres to the defined hierarchy of elements) if only one tag of a matched pair is included in the mark. This result would force the user to manually repair the target document structure by inserting the missing tags. This repair is necessary to assure the correct formatting of the target document.

In a non-WYSIWYG environment (one in which the structuring tags are displayed), this repair process would be difficult for a user who does not fully understand the target document structure and tedious for the more advanced user. In a WYSIWYG environment (one in which the structuring tags are not displayed), repair of the target document structure would be difficult for the advanced user and extremely difficult (maybe impossible) for a user who does not understand the structure of the target document.

The following terminology is used throughout this disclosure.

SGML Standardized General Markup Language. A markup language consisting of begin and end tags used to prepare structured documents. Refer to International Standards Organization standard 8879-1986 for definition and details.

Element. SGML-defined entity consisting of a begin tag and its content (including an end tag if necessary).

Root Element. The outermost element in a structured document which packages or surrounds all contents of the document.

Structured Document. A document which has a defined hierarchy of elements such as that defined by SGML.

Mark. A portion of a document, visually altered (i.e.—highlighted, reverse-videoed) to indicate its selection for processing (e.g.—moving, copying, deleting, translating to uppercase, etc.).

Beginning of Mark. The document position, closest to the beginning of a document, which defines the starting boundary of a mark.

End of Mark. The document position, closest to the end of a document, which defines the ending boundary of a mark.

Current Document Position. The document position which determines the focal point for an editing operation, usually the location of the cursor.

Source Document. A document which contains the mark.

Target Document. A document which contains the location to which the contents of the mark will be copied.

Target Location. The document position contained in the target document at which the contents of the mark will be inserted. Note that the target location can be contained within the document which contains the mark, but cannot be contained within the mark itself.

WYSIWYG. An acronym for "What you see is what you get." The term refers to the display of edited text in the same form as it will appear when printed.

OBJECTS OF THE INVENTION

It is therefore an object of the invention to provide an improved method for copying a marked portion of a structured document.

It is another object of the invention to provide an improved method to perform the copy of a marked portion of a structured document without damaging the structure of the target document.

SUMMARY OF THE INVENTION

These and other objects, features and advantages of the invention are accomplished by the method for copying a marked portion of a structured document, disclosed herein.

The invention is a method to copy a marked portion of a structured source document without invalidating the structure of the target document. The method is referred to as the structured copy function, and it can be used to copy a marked portion of a structured source document to a specified target location. During the copy operation, this function will determine which begin tags and end tags in the structured document are necessary to make the contents of the current mark structurally valid. The missing begin tags, the contents of the mark and the missing end tags will be verified at the target location and the copy operation will be performed only if the repaired marked contents are valid at the target location.

Before the marked portion is copied, the begin and end mark positions are adjusted according to a set of heuristic rules. The heuristic rules have been designed in order to assure that the fewest number of tags are added to the contents of the mark when repairing the structure of the contents of the mark. Once the heuristic adjustments are completed, the method of the invention will examine the contents of the marked portion of the structured source document and determine which begin tags and end tags are not matched, that is those tags whose corresponding partner tags are not included in the mark. Those begin tags whose end tags have not been marked and also those end tags whose corresponding begin tags have not been marked, will be saved for validation with the contents of the mark. Once the missing begin tags and end tags have been determined, validation is performed in accordance with the invention, to determine if the missing begin tags, the contents of the mark and the missing end tags can be inserted at the target location without damaging the structure of the target document. If this can be done, the copy operation is performed. Otherwise, no change is made to the source and target documents. In this manner, the user is provided with a method to perform the copy operation of a marked portion of a structured source document without damaging the structure of the target document.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figure 1:
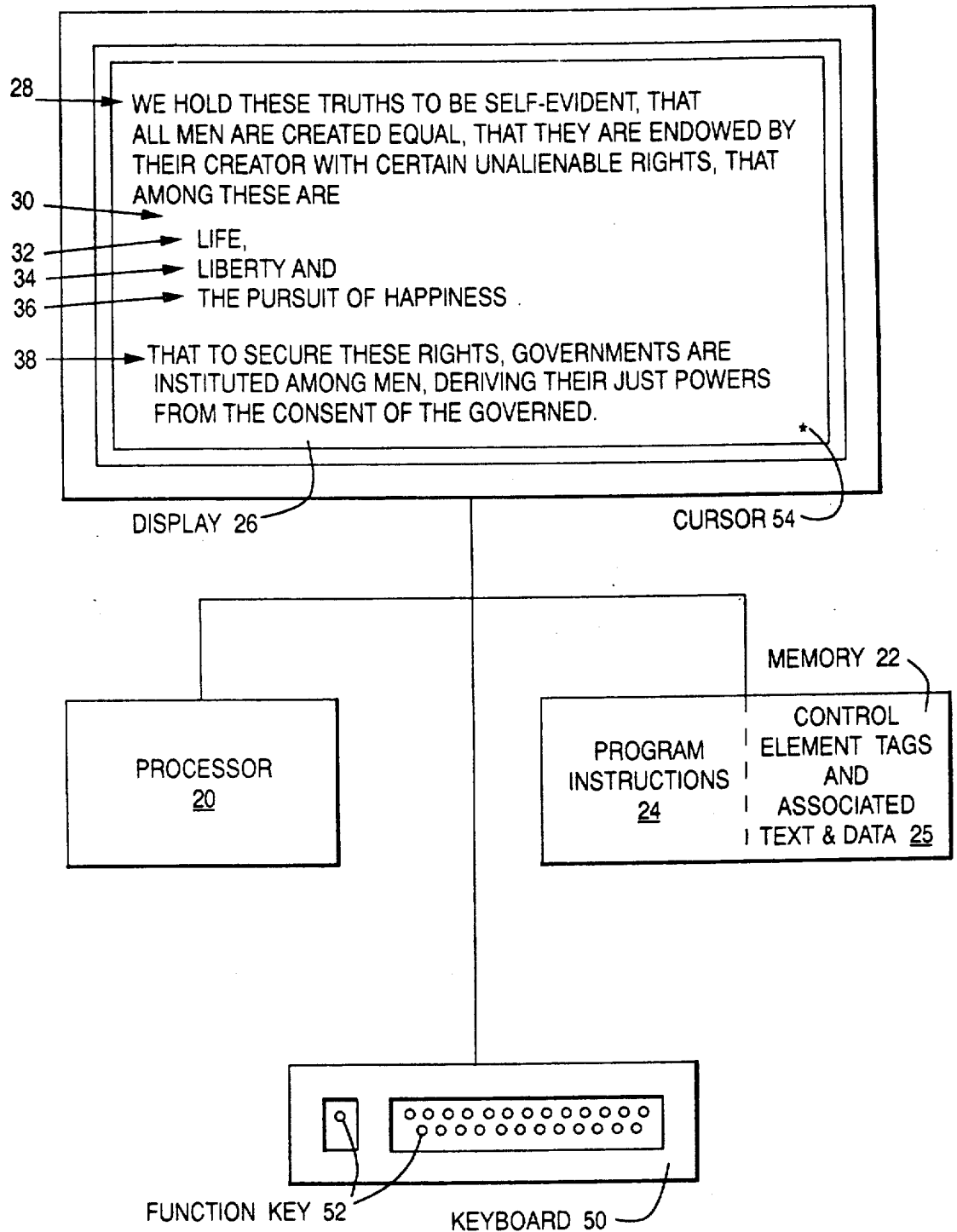
FIG. 1 is a system block diagram of the document editing system.
Figure 2:
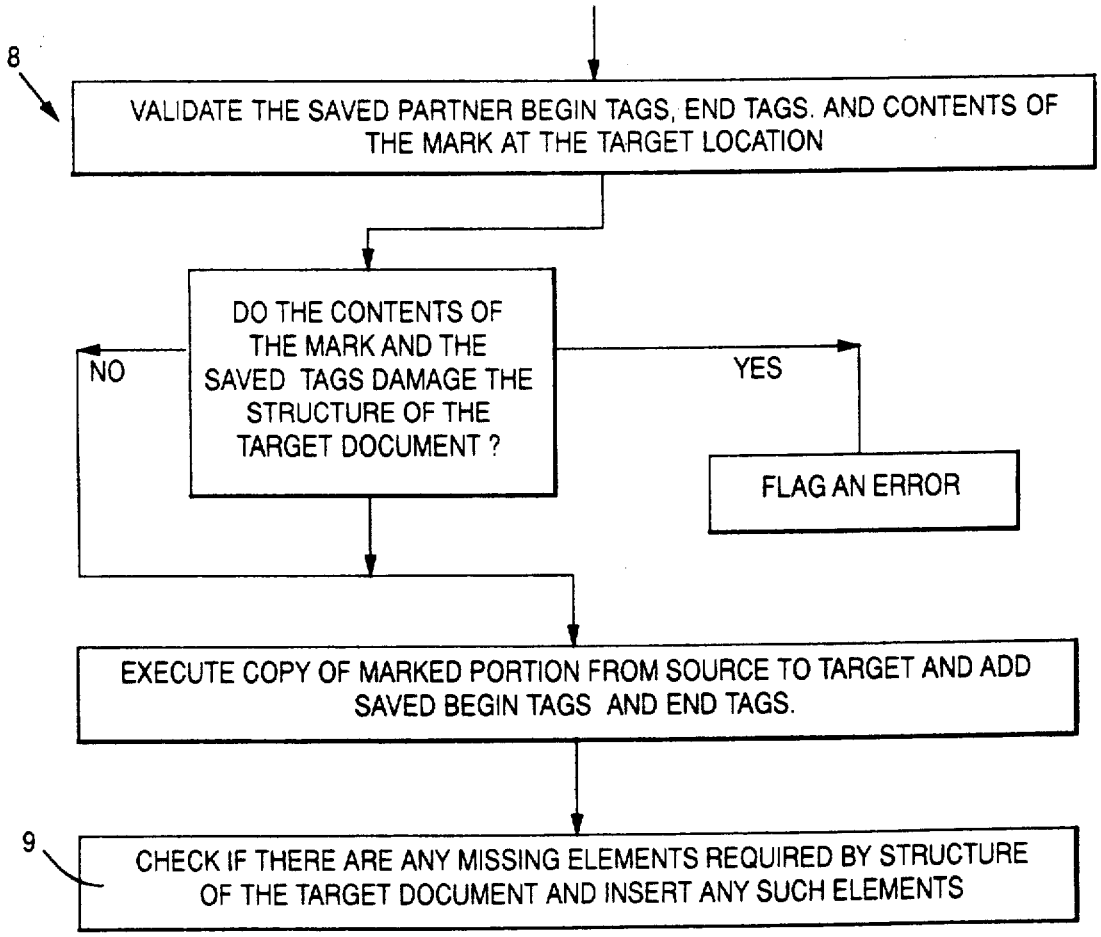
FIG. 2 is an example of control element tags and associated text.

The document editing system shown in FIG. 1 includes a processor 20 and a memory 22, both coupled to the keyboard 50 and the display 26. The processor 20 executes program instructions 24 stored in the memory 22. The display device 26 coupled to the processor 20 displays in WYSIWYG form, a plurality of document images such as paragraphs 28 and 38, the list 30, which includes the list items 32, 34 and 36, shown in the display 26 of FIG. 1. Images can include lists which are either unordered or ordered, and images can also include graphics as well as text. The document images 28-38 are displayed in an ordered sequence, as can be seen in FIG. 2, using structured document notation, where the ordered sequence is specified by a corresponding ordered sequence of a plurality of image control elements or tags. The paragraph 28 in FIG. 2 is shown in the structured document notation at begin tag [p], and at end tag [/p]. Each image such as the paragraph 28 shown in FIG. 2, is a structured document element having a begin tag [p], the text of the paragraph, and then an end tag [/p]. The begin tag and the end tag serve as an image type value, in this case indicating a paragraph. The order of occurrence of the paragraph 28 as occurs on the display 26, is determined by the order of occurrence of the structured document element representing that paragraph 28 shown in FIG. 2, within the context of the order of occurrence of the other structured document elements such as for the list 30 and for the list 38. This order of occurrence of the structured document elements is a sequence indication.

Figure 3:
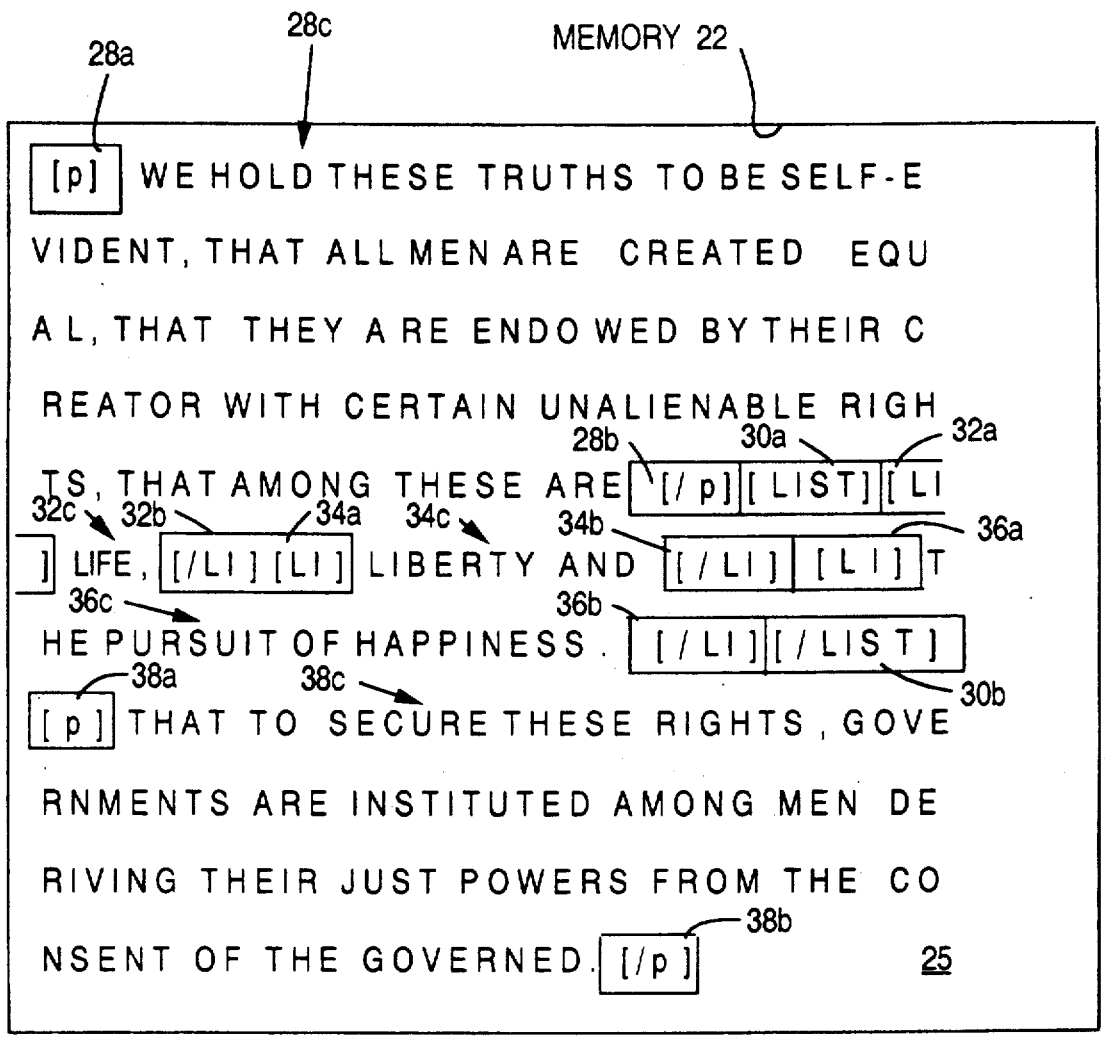
FIG. 3 is a depiction of the memory organization of control element tags and associated text.

The order of occurrence of the structured document elements such as the paragraph 28, list 30 and the paragraph 38, can be determined by their order of storage in the memory 22 as shown in FIG. 3. FIG. 3 shows that the control element tags and associated text 25 of FIG. 2 have been stored in the memory 22 in a linear sequential order. The paragraph 28 is represented by the begin tag 28A and the end tag 28B which surrounds the paragraph text 28C. The list 30 represented by begin tag 30A and the end tag 30B and the information contained therebetween, has been stored in the next consecutive memory locations in the memory 22, after the location of the paragraph 28. This would provide a sequence indication for the paragraph 28 and the list 30.

Contained within the list 30, between the begin tag 30A and the end tag 30B, is the list item elements 32, 34 and 36. The list item element 32 is represented by the begin tag 32A and the end tag 32B, between which is located the text 32C. The list item element 34 is represented by the begin tag 34A, the end tag 34B and between which lies the text 34C. The list item element 36 is represented by the begin tag 36A, the end tag 36B and the text lying therebetween, 36C.

Located in consecutive memory locations following the list 30, is the paragraph 38 which consists of the begin tag 38A and the end tag 38B, between which lies the text portion 38C.

In an alternate embodiment of the invention, the sequence of image control elements can have threaded addresses, which can go both in the forward direction and in the reverse direction, so that each respective image control element contains the prior address of the preceding image control element and the next address for the next occurring image control element. In this manner, the program instructions can progress along the sequence of image control elements in the same order as for their corresponding images as they occur in the display 26.

The location of the cursor 54 within the text 25 is determined by a pointer which sequentially points to consecutive memory locations in the memory 22 where the text 25 is stored.

The keyboard 50 is coupled to a processor 20, and can have one or more function keys 52, including a copy function key. The display device 26 includes a cursor 54, displayed thereon, at a current document position in the sequence of images 28 through 38, where a result of actuating the copy function key 52 is to have effect.

The Structured Copy function invention can be used to copy a marked portion of a structured source document 25 to a specified target location, by actuating the copy function key 52, for example. The command to copy can also be entered from a commercial line. During the copy, the invention will determine which begin and end tags are necessary to make the contents of the current mark structurally valid. The missing begin tags, the contents of the mark and the missing end tags will be verified at the target location and the copy will be performed only if the repaired mark contents are valid at the target location.

Before the marked portion is copied the begin and end mark positions are adjusted according to a set of heuristic rules. The heuristic rules have been designed in order to assure that the fewest number of tags are added to the contents of the mark when repairing the structure of the contents of the mark.

Once the heuristic adjustments are completed, the invention will examine the contents of the marked portion of the structured source document and determine which begin and end tags are unmatched (i.e.—those tags whose corresponding partner tags are not included in the mark). Those begin tags whose end tags have not been marked, and vice versa, will be saved for validation with the contents of the mark. Once the missing begin and end tags have been determined, validation is performed to determine if the missing begin tags, the contents of the mark and the missing end tags can be inserted at the target location without damaging the structure of the target document. If so, the copy is performed. Otherwise, no change is made to the source and target documents.

Figure 4:
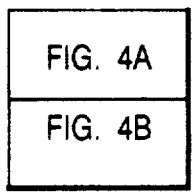
FIG. 4 is a flow diagram of the method of the invention, and is divided into FIGS. 4A and 4B.
Figure 4A:
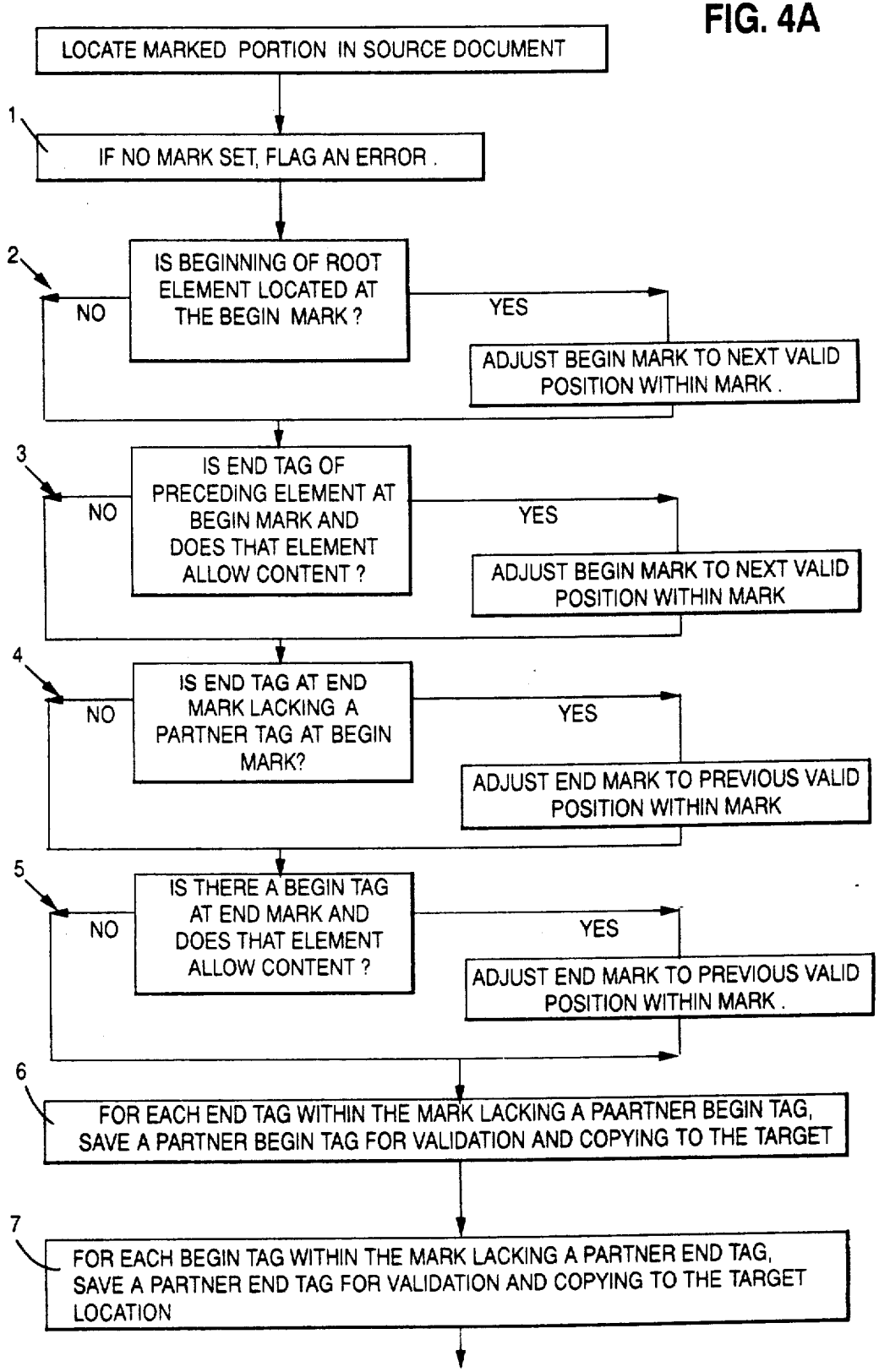

The flow diagram of FIG. 4 describes the sequence of operational steps of the program instructions 24, in accordance with the invention, to carry out the structured copy function.

Step 1: If no mark has been set—An error is generated.

Step 2: If the beginning of the root element of the document is located at the begin mark document position—The begin mark document position is adjusted to the next valid position within the mark. If this causes the mark to collapse to an empty mark, no copy is performed. Since a structured document can contain only a single root element, this heuristic is used to guarantee that the user cannot include the root element in the mark which will be copied.

Step 3: If the end tag of an element which allows content exists at the begin mark document position—The begin mark position is adjusted to the next valid position within the mark. If this causes the mark to collapse to an empty mark, no copy is performed. This heuristic is used to guarantee that an empty element is not included at the beginning of the mark when the mark is copied.

Step 4: If an end tag exists at the end mark document position and the begin tag associated with the end tag is not marked—The end mark document position is adjusted to the previous valid document position within the mark. If this causes the mark to collapse to an empty mark, no copy is performed. This heuristic is used to eliminate an unnecessary begin tag from being added to the contents of the mark when the copy is validated and performed.

Step 5: If the begin tag of an element which allows content is located at the end mark document position—The end mark document position is adjusted to the previous valid position within the mark. If this causes the mark to collapse to an empty mark, no copy is performed. This heuristic is used to guarantee that an empty element is not included at the end of the mark when the mark is copied.

Step 6: For each end tag within the marked portion of the structured source document—If the corresponding begin tag is outside the marked portion, the begin tag is saved for validation and copying of the mark to the target location.

Step 7: For each begin tag within the marked portion of the structured source document—If the corresponding end tag is outside the marked portion, the end tag is saved for validation and copying of the mark to the target location.

Step 8: When all begin and end tags are processed within the marked portion—The missing begin tags, the contents of the mark and the missing end tags are validated at the target location. If the contents of the mark and the missing tags do not damage the structure of the target document, the copy is performed by inserting all missing begin tags, copying the contents of the mark and inserting the missing end tags into the target document at the target location. If the copy cannot be validated, an error is generated.

Step 9: When the copy is completed—A check is made to determine if any elements required by the document hierarchy are missing from the copied range. If so, these elements are inserted (with no content) at the appropriate document positions.

Examples

The following examples are provided for clarification of the disclosed invention. In the following examples, the current document position is represented by "*" (asterisk). The contents of the current marked portion are boldface. Begin tags are enclosed by "[" and "]" (brackets). End tags are enclosed by "[/" and "]" (end tags are included for clarity; in most cases they are not necessary). Begin and end tags which are saved for use in the validation and insertion performed by the Structured Copy function are terminated with capital X "X]". Tag names are IBM GML Starter Set tag names. Indentation is used to emphasize the hierarchical structure of the document.

EXAMPLE 1

Suppose the user is editing the following document and has already marked a portion of the document:

```
[gdoc]
    [p]This is the first paragraph in the document.[/p]
    [p]This is the second paragraph in the document and
    contains an ordered list, a quotation and an unordered
    list.
    [ol]
        [li]The first item in the ordered list[/li]
        [li]The second item in the ordered list[/li]
        [ul]
            [li]The first item in the unordered list[/li]
            [li]The second item in the unordered list[/li]
        [/ul]
        [li]The last item in the ordered list[/li]
    [/ol]
    [q]This is a quotation.[/q]
    [ul]
        [li]The only list item in the unordered list[/li]*
    [/ul]
[/p] [/gdoc]
```

If the user invokes the Structured Copy function of the invention in FIG. 4, the following processing would occur:

Step 1: Since a mark already exists in the document, no error is generated.

Step 2: Since the beginning of the root element is not located at the begin mark document position, no adjustment of the mark boundaries is performed.

Step 3: Since the end tag of an element which allows content is not located at the begin mark document position, the begin mark document position is adjusted to the next valid position in the mark. This would result in the following:

```
[gdoc]
    [p]This is the first paragraph in the document.[/p]
    [p]This is the second paragraph in the document
    and contains an ordered list, a quotation and
    an unordered list.
    [ol]
        [li]The first item in the ordered list[/li]
        [li]The second item in the ordered list[/li]
        [ul]
            [li]The first item in the unordered list[/li]
            [li]The second item in the unordered list[/li]
        [/ul]
        [li]The last item in the ordered list[/li]
    [/ol]
    [q]This is a quotation.[/q]
    [ul]
        [li]The only list item in the unordered list[/li]*
    [/ul]
[/p] [/gdoc]
```

Step 4: Since an end tag is not located at the end mark document position, and the begin tag associated with the end tag is not marked, the end mark document is adjusted to the previous valid position in the mark. This would result in the following:

```
[gdoc]
```

```
[p]This is the first paragraph in the document.[/p]
[p]This is the second paragraph-in the document
   and contains an ordered list, a quotation and
   an unordered list.
   [ol]
      [li]The first item in the ordered list[/li]
      [li]The second item in the ordered list[/li]
      [ul]
         [li]The first item in the unordered list[/li]
         [li]The second item in the unordered list[/li]
      [/ul]
      [li]The last item in the ordered list[/li]
   [/ol]
   [q]This is a quotation.[/q]
   [ul]
      [li]The only list item in the unordered list[/li]*
   [/ul]
[/p] [/gdoc]
```

Step 5: Since a begin tag is not located at the end mark document position, no adjustment of the mark boundaries is performed.

Step 6: Since the begin tag associated with each marked end tag is also marked, no saving of begin tags is performed.

Step 7: Since the end tag associated with each marked begin tag is also marked, no saving of end tags is performed.

Step 8: Since the mark does not require the addition of missing begin or end tags and since the mark is valid at the target location (the current document position), the copy is performed. This would result in the following:

```
[gdoc]
   [p]This is the first paragraph in the document.[/p]
   [p]This is the second paragraph in the document
      and contains an ordered list, a quotation and
      an unordered list.
      [ol]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/q]
      [ul]
         [li]The only list item in the unordered list[/li]*
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ul]
   [/p] [/gdoc]
```

Step 9: Since no required elements are missing from the copied range, no change is made to the document.

EXAMPLE 2

Suppose the user is editing the following document and has already marked a portion of the document:

```
[gdoc]
   [p]This is the first paragraph in the document.[/p]
   [p]This is the second paragraph in the document
      and contains an ordered list, a quotation and
      an unordered list.
      [ol]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/q]
      [ul]
         [li]The only list item in the unordered list[/li]
      [/ul]
   [/p]* [/gdoc]
```

If the user invokes the Structured Copy function of the invention in FIG. 4, the following processing would occur:

Step 1: Since a mark already exists in the document, no error is generated.

Step 2: Since the beginning of the root element is located at the begin mark document position, the begin mark document position is adjusted to the next valid position in the mark. This would result in the following:

```
[gdoc]
   [p]This is the first paragraph in the document.[/p]
   [p]This is the second paragraph in the document
      and contains an ordered list, a quotation and
      an unordered list.
      [ol]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/q]
      [ul]
         [li]The only list item in the unordered list[/li]
      [/ul]
   [/p]* [/gdoc]
```

Step 3: Since the end tag of an element which allows content is not located at the begin mark document position, no adjustment of the mark boundaries is performed.

Step 4: Since no end tag is located at the end mark document position, no adjustment to the mark boundaries is performed.

Step 5: Since a begin tag is located at the end mark document position and its corresponding end tag is not marked, the end mark document position is adjusted to the previous valid position within the mark. This would result in the following:

```
[gdoc]
   [p]This is the first paragraph in the document.[/p]
   [p]This is the second paragraph in the document
      and contains an ordered list, a quotation and
      an unordered list.
      [ol]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/q]
```

9

-continued

```
   [ul]
      [li]The only list item in the unordered list[/li]
   [/ul]
[/p]* [/gdoc]
```

Step 6: Since the begin tag associated with each marked end tag is also marked, no saving of begin tags is performed.

Step 7: Since the end tag associated with each marked begin tag is also marked, no saving of end tags is performed.

Step 8: Since the mark does not require the addition of missing begin or end tags and since the mark is valid at the target location (the current document position), the copy operation is performed. This would result in the following:

```
[gdoc]
   [p]This is the first paragraph in the document.[/p]
   [p]This is the second paragraph in the document
      and contains an ordered list, a quotation and
      an unordered list.
      [ol]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/q]
      [ul]
         [li]The only list item in the unordered list[/li]
      [/ul]
   [/p]*
   [p]This is the first paragraph in the document.[/p] [/gdoc]
```

Step 9: Since no required elements are missing from the copied range, no change is made to the document.

EXAMPLE 3

Suppose the user is editing the following document and has already marked a portion of the document:

```
[gdoc]
   [p]This is the first paragraph in the document.[/p]
   [p]This is the second paragraph in the document
      and contains an ordered list, a quotation and
      an unordered list.
      [ol]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/q]
      [ul]
         [li]The only list item in the unordered list[/li]
      [/ul]*
   [/p] [/gdoc]
```

If the user invokes the Structured Copy function of the invention in FIG. 4, the following processing would occur:

Step 1: Since a mark already exists in the document, no error is generated.

10

Step 2: Since the beginning of the root element is not located at the begin mark document position, no adjustment of the mark boundaries is performed.

Step 3: Since the end tag of an element which allows content is not located at the begin mark document position, no adjustment of the mark boundaries is performed.

Step 4: Since an end tag is not located at the end mark document position, no adjustment to the mark boundaries is performed.

Step 5: Since a begin tag is not located at the end mark document position, no adjustment of the mark boundaries is performed.

Step 6: Since unmatched end tags exist within the mark the associated begin tags not included in the mark are saved. This would result in the following:

```
[gdoc]
   [p]This is the first paragraph in the document.[/p]
   [p]This is the second paragraph in the document
      and contains an ordered list, a quotation and
      an unordered list.
      [olX]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/q]
      [ul]
         [li]The only list item in the unordered list[/li]
      [/ul]*
   [/p] [/gdoc]
```

Step 7: Since unmatched begin tags exist within the mark, the associated end tags not included in the mark are saved. This would result in the following:

```
[gdoc]
   [p]This is the first paragraph in the document.[/p]
   [p]This is the second paragraph in the document
      and contains an ordered list, a quotation and
      an unordered list.
      [olX]
         [li]The first item in the ordered list[/li]
         [li]The second item in the ordered list[/li]
         [ul]
            [li]The first item in the unordered list[/li]
            [li]The second item in the unordered list[/li]
         [/ul]
         [li]The last item in the ordered list[/li]
      [/ol]
      [q]This is a quotation.[/qX]
      [ul]
         [li]The only list item in the unordered list[/li]
      [/ul]*
   [/p] [/gdoc]
```

Step 8: Since the saved begin tag, the contents of the mark and the saved end tag are valid at the target location (current document position), the copy operation is performed. This would result in the following:

```
[gdoc]
   [p]This is the first paragraph in the document.[/p]
   [p]This is the second paragraph in the document
      and contains an ordered list, a quotation and
      an unordered list.
      [ol]
         [li]The first item in the ordered list[/li]
```

```
    [li]The second item in the ordered list[/li]
    [ul]
        [li]The first item in the unordered list[/li]
        [li]The second item in the unordered list[/li]
    [/ul]
    [li]The last item in the ordered list[/li]
[/ol]
[q]This is a quotation.[/q]
[ul]
    [li]The only list item in the unordered list[/li]
[/ul]*
[ol]
    [li]The first item in the ordered list[/li]
    [li]The second item in the ordered list[/li]
    [ul]
        [li]The first item in the unordered list[/li]
        [li]The second item in the unordered list[/li]
    [/ul]
    [li]The last item in the ordered list[/li]
[/ol]
[q]This is a[/q]
[/p] [/gdoc]
```

Note that the saved begin tag "[ol]" and the saved end tag "[/q]" have been inserted at the beginning and ending, respectively, of the copied text at the target location.

Step 9: Since no required elements are missing from the copied range, no change is made to the document.

EXAMPLE 4

Suppose the user is editing the following document and has already marked a portion of the document:

```
[gdoc]
    [p]This is the first paragraph of the document.
        The document contains a single chapter whose
        title element is required by the document
        hierarchy.[/p]
    [h1]
        [title]TITLE FOR CHAPTER[/title]
        [p]This is the first paragraph of the chapter.[/p]
        [ol]
            [li]First list item in ordered list[/li]
            [li]Second list item in ordered list[/li]
        [/ol]
        [p]This is the last paragraph in the chapter.[/p]
    [/h1]
    [p]This is the final paragraph
        of the document.[/p]* [/gdoc]
```

If the user invokes the Structured Copy function of the invention in FIG. 4, the following processing would occur:

Step 1: Since a mark already exists in the document, no error is generated.

Step 2: Since the beginning of the root element is not located at the begin mark document position, no adjustment of the mark boundaries is performed.

Step 3: Since the end tag of an element which allows content is not located at the begin mark document position, no adjustment of the mark boundaries is performed.

Step 4: Since an end tag is not located at the end mark document position, no adjustment to the mark boundaries is performed.

Step 5: Since a begin tag is not located at the end mark document position, no adjustment of the mark boundaries is performed.

Step 6: Since unmatched end tags exist within the mark, the associated begin tags not included in the mark are saved. This would result in the following:

```
[gdoc]
    [p]This is the first paragraph of the document.
        The document contains a single chapter whose
        title element is required by the document
        hierarchy.[/p]
    [h1X]
        [title]TITLE FOR CHAPTER[/title]
        [p]This is the first paragraph of the chapter.[/p]
        [ol]
            [li]First list item in ordered list[/li]
            [li]Second list item in ordered list[/li]
        [/ol]
        [p]This is the last paragraph in the chapter.[/p]
    [/h1]
    [p]This is the final paragraph
        of the document.[/p]* [/gdoc]
```

Step 7: Since unmatched begin tags exist within the mark, the associated end tags not included in the mark are saved. This would result in the following:

```
[gdoc]
    [p]This is the first paragraph of the document.
        The document contains a single chapter whose
        title element is required by the document
        hierarchy.[/p]
    [h1X]
        [title]TITLE FOR CHAPTER[/title]
        [p]This is the first paragraph of the chapter.[/p]
        [ol]
            [li]First list item in ordered list[/li]
            [li]Second list item in ordered list[/li]
        [/ol]
        [p]This is the last paragraph in the chapter.[/p]
    [/h1]
    [p]This is the final paragraph
        of the document.[/pX]* [/gdoc]
```

Step 8: Since the saved begin tag, the contents of the mark and the saved end tag are valid at the target location (current document position), the copy operation is performed. This would result in the following:

```
[gdoc]
    [p]This is the first paragraph of the document.
        The document contains a single chapter whose
        title element is required by the document
        hierarchy.[/p]
    [h1X]
        [title]TITLE FOR CHAPTER[/title]
        [p]This is the first paragraph of the chapter.[/p]
        [ol]
            [li]First list item in ordered list[/li]
            [li]Second list item in ordered list[/li]
        [/ol]
        [p]This is the last paragraph in the chapter.[/p]
    [/h1]
    [p]This is the final paragraph
        of the document.[/pX]*
    [h1]
        [p]This is the last paragraph in the chapter.[/p]
    [/h1]
    [p]This is the final[/p] [/gdoc]
```

Step 9: Since the title element is required by the document hierarchy, the following insertion is made in the newly copied [h1] element:

```
[gdoc]
    [p]This is the first paragraph of the document.
        The document contains a single chapter whose
        title element is required by the document
        hierarchy.[/p]
    [h1X]
```

```
[title]TITLE FOR CHAPTER[/title]
[p]This is the first paragraph of the chapter.[/p]
[ol]
    [li]First list item in ordered list[/li]
    [li]Second list item in ordered list[/li]
[/ol]
[p]This is the last paragraph in the chapter.[/p]
[/h1]
[p]This is the final paragraph
of the document.[/pX]*
[h1]
[title] [/title]
[p]This is the last paragraph in the chapter.[/p]
[/h1]
[p]This is the final[/p] [/gdoc]
```

The invention described herein requires the use of no special hardware or software. The invention can be implemented by any editor which operates upon structured documents.

The resulting invention guarantees that a structured document remains in a valid state when a marked portion is copied into it.

The invention exploits the defined hierarchy of a structured document in a generic manner. That is to say, the invention will preserve the structure of the document by determining which begin and end tags are unmatched in the marked portion of the document. The invention always leaves a structured document in a valid state whether or not the marked portion contains matched sets of begin and end tags. The invention allows the user to mark a portion of a structured document and not be concerned whether he has included matched sets of begin and end tags in the mark. The invention relieves the user of having to fully understand the structure of the document since the structured copy will never result in an invalid document structure. The invention relieves the user of manually repairing the structure of the document receiving the marked portion after a copy is performed. The invention is useful in both WYSIWYG and non-WYSIWYG environments.

Although a specific embodiment of the invention has been disclosed, it will be understood by those having skill in the art that minor changes can be made to the specific embodiment without departing from the spirit and the scope of the invention.

We claim:

1. A computer method in a data processing system for copying text in a SGML structured document, comprising the steps of:

inputting by a user to a data processing system, SGML information defining an SGML hierarchy with a higher level type tag which is higher in the hierarchy than a lower level type tag and defining as a first tag pair a higher level type begin tag and a higher level type end tag and defining as a second tag pair a lower level type begin tag and a lower level type end tag;

inputting by a user to said data processing system a document with SGML tags, including a first higher level type begin tag, followed by a first lower level type begin tag, followed by a first text, followed by a first lower level type end tag which is paired with said first lower level type begin tag, which is followed by a second text, which is followed by a first higher level type end tag which is paired with said first higher level type begin tag, which is followed by a third text;

inputting by a user to said data processing system a marking of a source text in said document, said source text including said first text, said first lower level type end tag and said second text, said user further inputting a designation in said third text of a target location, said user further inputting a command to said data processing system to copy said source text to said target location;

identifying with said data processing system that said first lower level type end tag is in said source text;

searching with said data processing system for said first lower level type begin tag to form said second tag pair;

copying with said data processing system, said first lower level type begin tag forming a copied begin tag, copying said source text forming a copied source text and appending said copied begin tag to the beginning of said copied source text forming an insertion text;

inserting with said data processing system, said insertion text into said third text at said target location.

2. A computer method in a data processing system for copying text in a SGML structured document, comprising the steps of:

inputting by a user to a data processing system, SGML information defining an SGML hierarchy with a higher level type tag which is higher in the hierarchy than a lower level type tag and defining as a first tag pair a higher level type begin tag and a higher level type end tag and defining as a second tag pair a lower level type begin tag and a lower level type end tag;

inputting by a user to said data processing system a document with SGML tags, including a first higher level type begin tag, followed by a first text, followed by a first lower level type begin tag, followed by a second text, followed by a first lower level type end tag which is paired with said first lower level type begin tag, which is followed by a first higher level type end tag which is paired with said first higher level type begin tag, which is followed by a third text;

inputting by a user to said data processing system a marking of a source text in said document, said source text including said first text, said first lower level type begin tag and said second text, said user further inputting a designation in said third text of a target location, said user further inputting a command to said data processing system to copy said source text to said target location;

identifying with said data processing system that said first lower level type begin tag is in said source text;

searching with said data processing system for said first lower level type end tag to form said second tag pair;

copying with said data processing system, said first lower level type end tag forming a copied end tag, copying said source text forming a copied source text and appending said copied end tag to the ending of said coupled source text forming an insertion text;

inserting with said data processing system, said insertion text into said third text at said target location.

* * * * *